United States Patent [19]

Nishioka

[11] Patent Number: 6,059,589

[45] Date of Patent: May 9, 2000

[54] CONNECTOR DEVICE FOR IC CARD

[75] Inventor: Toru Nishioka, Miyagi-ken, Japan

[73] Assignee: Alps Electric Co., Ltd., Tokyo, Japan

[21] Appl. No.: 09/301,088

[22] Filed: Apr. 28, 1999

[30] Foreign Application Priority Data

May 1, 1998 [JP] Japan .................................. 10-122214

[51] Int. Cl.[7] .................................................. H01R 13/62
[52] U.S. Cl. ............................................................ 439/159
[58] Field of Search .................................... 439/159, 152, 439/155, 541.5

[56] References Cited

U.S. PATENT DOCUMENTS

| | | |
|---|---|---|
| 5,499,925 | 3/1996 | Lwee . |
| 5,536,180 | 7/1996 | Ishida et al. ............................. 439/159 |
| 5,575,669 | 11/1996 | Lin et al. . |
| 5,599,197 | 2/1997 | Ishida et al. ............................. 439/159 |
| 5,846,096 | 12/1998 | Ishida ...................................... 439/159 |

FOREIGN PATENT DOCUMENTS 6-13072   2/1994   Japan .

*Primary Examiner*—Neil Abrams
*Assistant Examiner*—Brian S. Webb
*Attorney, Agent, or Firm*—Brinks Hofer Gilson & Lione

[57] ABSTRACT

An IC card connector device in which an IC card ejecting operation and a misoperation canceling operation are selectively performed. A frame for guiding an IC card at insertion and extraction is provided with a circulation cam groove and a clearance groove with which a second transmission pin pivotally supported by a pushrod is selectively engaged. By pushing the pushrod after projecting it to a first projecting, a drive plate that is placed in the circulation cam groove is pushed via the second transmission pin, thereby ejecting the IC card. When a misoperation occurs, the second transmission pin is caused to trace the clearance groove, by pulling the pushrod frontward and then pushing the pushrod, thereby canceling an IC card ejecting operation. Furthermore, a handle (actuating element) of the pushrod is provided with a heartshaped cam groove with which a first transmission pin pivotally supported on the frame is engaged. The pushrod can be held in a predetermined retracted position by retaining the first transmission pin at a predetermined position of the heart-shaped cam groove.

3 Claims, 11 Drawing Sheets

CONNECTOR DEVICE FOR IC CARD

BACKGROUND OF THE INVENTION

1. Field of the Invention

The present invention relates to an IC card connector device incorporated in an apparatus that is used with an IC card inserted therein and extracted therefrom, and more particularly, to an ejection mechanism for ejecting an IC card in a loaded state.

2. Description of the Related Art

A general type of IC card connector device roughly comprises a pin header section in which a large number of pin contacts to be connected to socket contacts in an IC card are arranged in a pin housing, a frame for guiding the IC card during insertion and extraction, an ejection mechanism for disconnecting the loaded IC card from the pin contacts, and the like. In another known type of connector device, the pin housing and the frame are molded in one piece.

Conventionally, an ejection mechanism is widely used that includes a pushrod held on the outer side face of the frame to reciprocate in the IC card inserting and extracting direction, and an ejection lever pivotally supported on the frame or the pin housing and engaged at one end with the pushrod. In a connector device having such an ejection mechanism, when the pushrod is pushed in the state in which the IC card is loaded, a protruding piece of the ejection lever pivots in relation to the pushrod, thereby pushing the IC card frontward to the position where the IC card is allowed to be easily pulled out by the fingers. However, since the pushrod is projecting frontward when the IC card is loaded, it may be misoperated or suffer impact, and the IC card may be ejected unexpectedly. In this case, the IC card is disconnected, and trouble arises, for example, operation data is lost.

In contrast, an IC card connector device disclosed in Japanese Unexamined Utility Model 6-13072 comprises first and second transmission levers for linking a pushrod and a slide plate, a third transmission lever supported by the first transmission lever so as to be engaged with and disengaged from the second transmission lever, and a heart-shaped cam mechanism that is able to hold the pushrod in a predetermined retracted position and a first projecting position. The amount of depression of the pushrod is selectively transmitted to the slide plate in accordance with the amount of projection of the pushrod. That is, while an IC card is loaded, the third transmission lever is not engaged with the second transmission lever, and the pushrod is held in the retracted position where it is depressed by a predetermined amount. When the pushrod is projected to the first projecting position by the heart-shaped cam groove and is then further pulled to a second projecting position, the third transmission lever is engaged with the second transmission lever at the second projecting position. When the pushrod is pushed to the retracted position in this state, the pushing force is transmitted to the slide plate via the transmission levers, and the slide plate pushes and ejects the IC card frontward. Therefore, in this IC card connector device, while the IC card is connected, the pushrod is held in the retracted position where it is not projecting frontward. Only in ejecting the IC card, the pushrod is projected to the second projecting position, and is then pushed in. This can prevent the IC card from being disconnected due to a misoperation of the pushrod or the like.

As described above, in the disclosed IC card connector, the pushrod can be held in the predetermined retracted position while the IC card is connected. Therefore, it is possible to prevent the IC card from disconnection that may be caused when the pushrod is misoperated or suffer impact in the depressing direction. Since the pushrod must be projected to the second projecting position in order to eject the IC card, even if the pushrod is inadvertently projected to the first projecting position although the IC card need not be ejected, it can be returned to the retracted position without ejecting the IC card, by pushing the pushrod from the first projecting position without pulling it to the second projecting position. According to the above-described structure, for example, even when a lower pushrod is pushed instead of an upper pushrod by mistake in an IC card connector device capable of containing two IC cards, such a misoperation does not become serious, and the ejecting operation can be performed safely.

In such a conventional IC card connector device, however, the force for pushing the pushrod is transmitted to or cut from the slide plate in accordance with the positions of three transmission levers that are linked between the pushrod and the slide plate. This needs a sufficiently wide space to pivot the transmission levers therein, and hinders the size reduction of the IC card connector device. Furthermore, for this reason, the transmission levers must be placed on the top side or bottom side of an IC card insertion slot. In particular, in the case of a multiple IC card connector device that is able to load or unload two or more IC cards, since there is a need to vertically stack a plurality of pairs of transmission levers in a sufficient space, the IC card connector device is also enlarged in the height direction. Furthermore, such a conventional IC card connector device needs three operations in a normal ejecting operation: an operation of projecting the pushrod to the first projecting position by pushing the pushrod held in the retracted position; an operation of pulling the pushrod in the first projecting position to the second projecting position; and an operation of pushing the pushrod projected in the second projecting position into the retracted position. This makes the ejecting operation troublesome. Moreover, since the IC card ejecting operation is performed after the pushrod is projected to the second projecting position via the first projecting position, the two operations of projecting the pushrod are apt to be performed in succession. For this reason, there is a fear that the pushrod will be inadvertently projected to the second projecting position, and that it cannot be returned to the initial position without ejecting the IC card.

SUMMARY OF THE INVENTION

Accordingly, it is an object of the present invention to provide an IC card connector device having high operability and an reduced size, in which a pushrod can be held in a retracted position while an IC card is connected, and in which an IC card ejecting operation and a misoperation canceling operation can be selectively performed.

According to an aspect of the present invention, there is provided an IC card connector device having a frame for supporting an IC card so that the IC card can be inserted and extracted, a pushrod held to reciprocate along the frame and elastically urged in an IC card ejecting direction, and a plurality of pin contacts to be connected to socket contacts in the loaded IC card, wherein the pushrod held in a predetermined retracted position is moved frontward by a first pushing operation while the IC card is loaded, and the pushrod held in a predetermined projecting position is pushed by a second pushing operation to eject the IC card, the IC card connector device comprising a heart-shaped cam groove cut in an actuating element of the pushrod, a first transmission pin directly or indirectly attached to the frame to move along the heart-shaped cam groove, and retained at a predetermined position of the cam groove to hold the pushrod in the retracted position, a circulation cam groove and a clearance groove cut in the frame, and a second transmission pin attached to the pushrod to move along the circulation cam groove during the first and second pushing operations, and to push an IC card ejecting member while moving in a predetermined region of the circulation cam groove, wherein the pushrod is moved from the retracted position to the first projecting position and is held thereat by the first pushing operation, and the IC card is ejected via the second transmission pin by the second pushing operation when the pushrod is in the first projecting position, and wherein the pushrod in the first projecting position is moved by a pulling operation to a second projecting position that is closer to the front side than the first projecting position, the second transmission pin moves from the circulation cam groove to the clearance groove in response to the pulling operation, and the second transmission pin is moved to the circulation cam groove along the clearance groove by a pushing operation for the pushrod in the second projecting position.

In the IC card connector device having the above configuration, the pushrod can be held in the predetermined retracted position by retaining the first transmission pin at the predetermined position in the heart-shaped cam groove. Moreover, the pushrod elastically urged in the IC card ejecting direction can be moved to and held in the first projecting position by the first pushing operation for the pushrod in the retracted position. By the second pushing operation for the pushrod in the first projecting position, the loaded IC card can be ejected via the second transmission pin that moves along the circulation cam groove. Therefore, in normal use, ejection can be easily performed by two pushing operations. If the pushrod is projected from the retracted position by being inadvertently pushed although there is no need to eject the IC card, it is pulled frontward from the projecting position (the first projecting position) and is projected to the second projecting position. Since the second transmission pin is thereby moved from the circulation cam groove to the clearance groove, it can be returned to the circulation cam groove along the clearance groove by the pushing operation for the pushrod in the second projecting position, and simultaneously, the first transmission pin can be returned to the predetermined position in the heart-shaped cam groove. This makes it possible to return the pushrod to the retracted position while canceling the IC card ejecting operation. That is, according to this connector device, it is possible to prevent an accident of IC card disconnection that may be caused when the pushrod is misoperated or suffer impact in the retracting direction, to improve operability during ejection, and to easily return the misoperated pushrod to the state before the misoperation. Furthermore, since the heart-shaped cam groove is provided in the actuating element of the pushrod and the circulation cam groove and the clearance groove are provided in the frame, it is possible to compactly place the ejection mechanism in the pushrod and the frame. This promotes size reduction of the IC card connector device. In particular, the present invention is suitable for use in an IC card connector device in which a plurality of IC cards can be loaded.

Preferably, the IC card ejecting member is a drive plate that is held to reciprocate along the frame and that enters the circulation cam groove when the IC card is loaded, and the IC card is ejected by pushing the drive plate by the second transmission pin. Furthermore, preferably, the second transmission pin returns to the circulation cam groove through a path in which it is not in contact with the drive plate, by being moved along the clearance groove during the pushing operation for the pushrod in the second projecting position.

Further objects, features and advantages of the present invention will become apparent from the following description of the preferred embodiments with reference to the attached drawings.

DESCRIPTION OF THE PREFERRED EMBODIMENT

Figure 1:
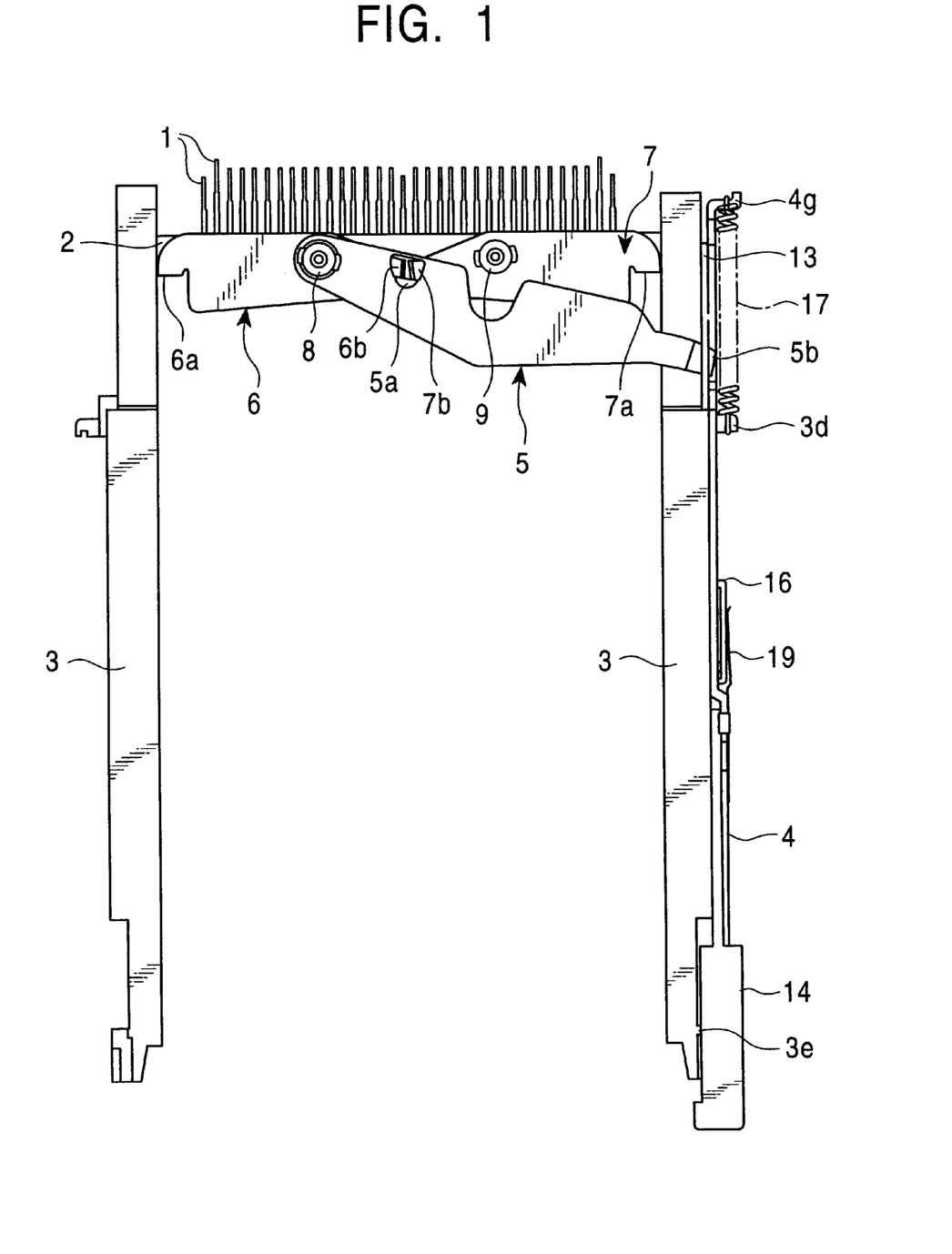
FIG. 1 is a plan view of an IC card connector device according to an embodiment of the present invention.
Figure 4:
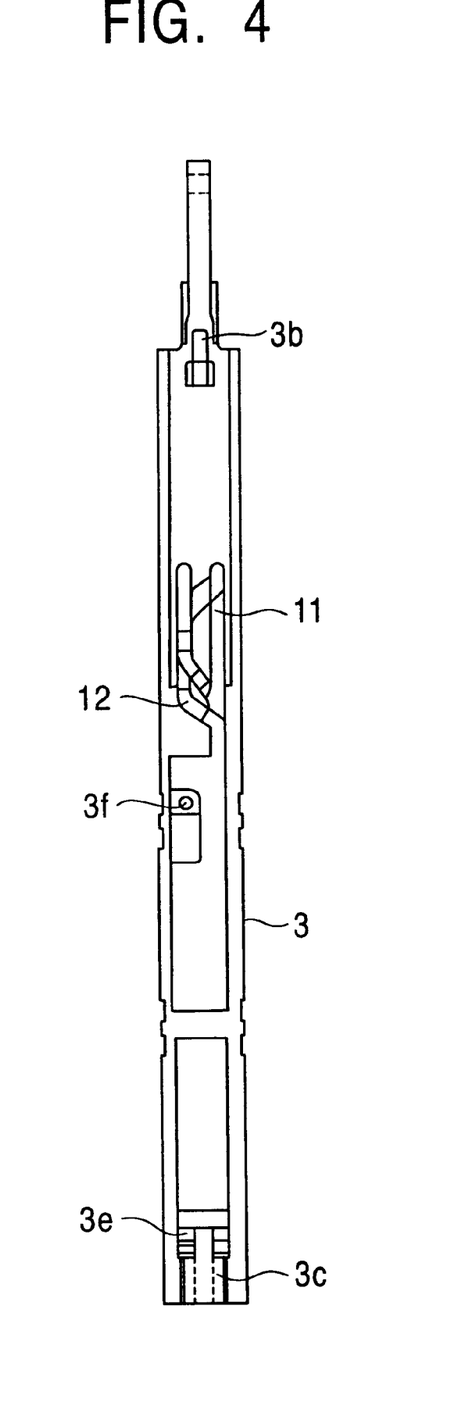
FIG. 4 is a side view of a frame shown in FIG. 3.
Figure 5:
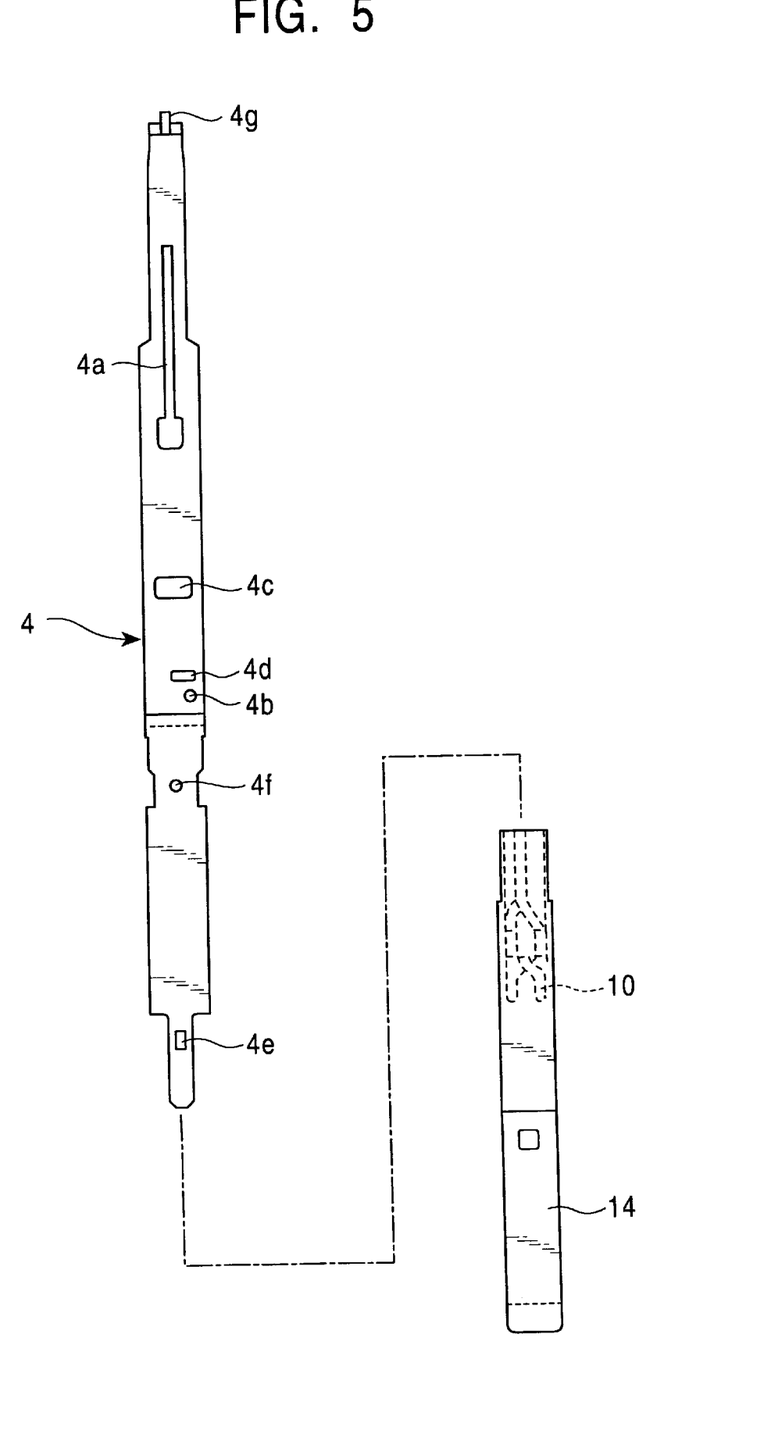
FIG. 5 is an exploded side view of a pushrod shown in FIG. 3.
Figure 6:
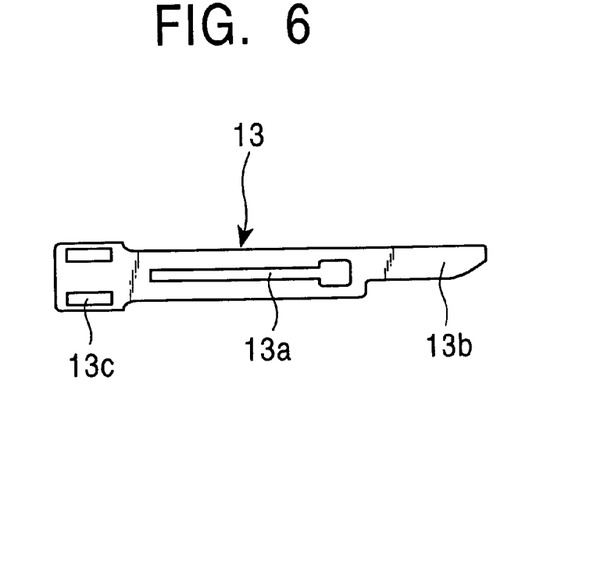
FIG. 6 is a side view of a drive plate shown in FIG. 3.
Figure 7A:
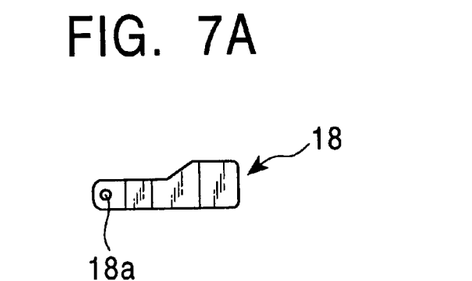
FIGS. 7A and 7B are side views of first and second presser bar springs shown in FIG. 3.
Figure 7B:
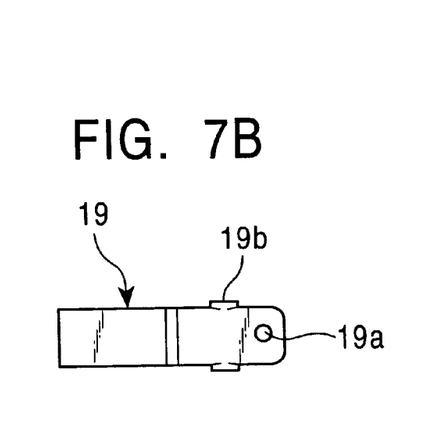
Figure 8A:
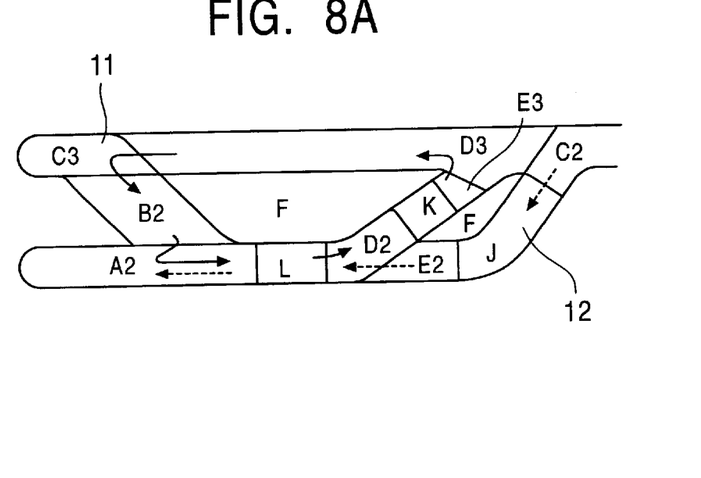
FIGS. 8A, 8B, and 8C are explanatory views showing detailed shapes of a circulation cam groove and a clearance groove shown in FIG. 4 and the heights of cam faces thereof.
Figure 8B:
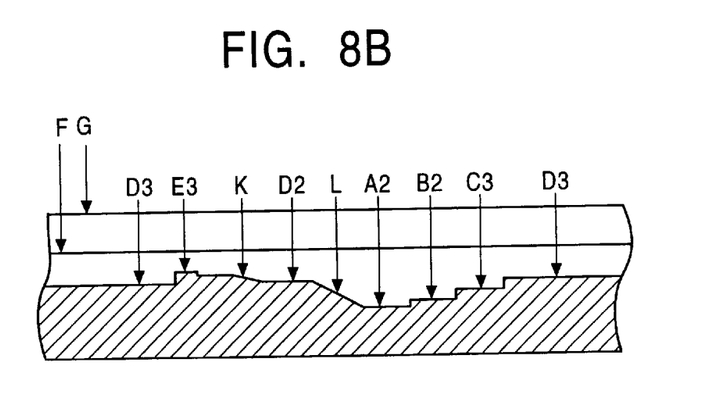
Figure 8C:
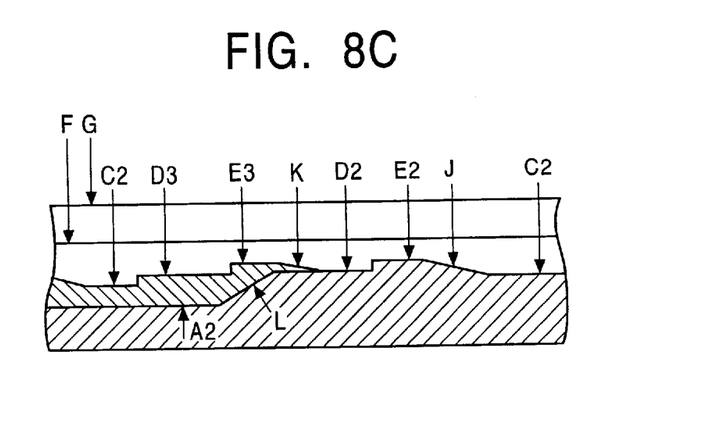
Figure 9A:
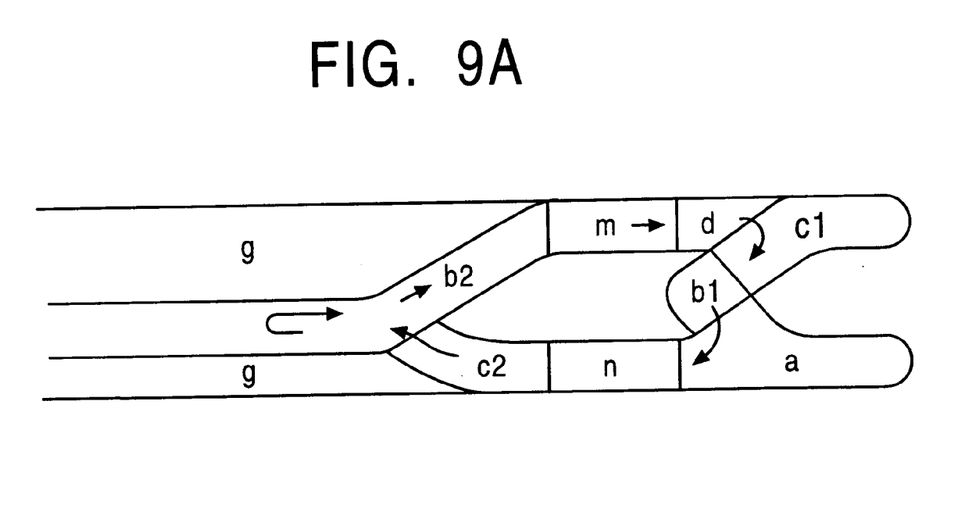
FIGS. 9A and 9B are explanatory views showing a detailed shape of a heart-shaped cam groove shown in FIG. 5 and the heights of cam faces thereof.
Figure 9B:
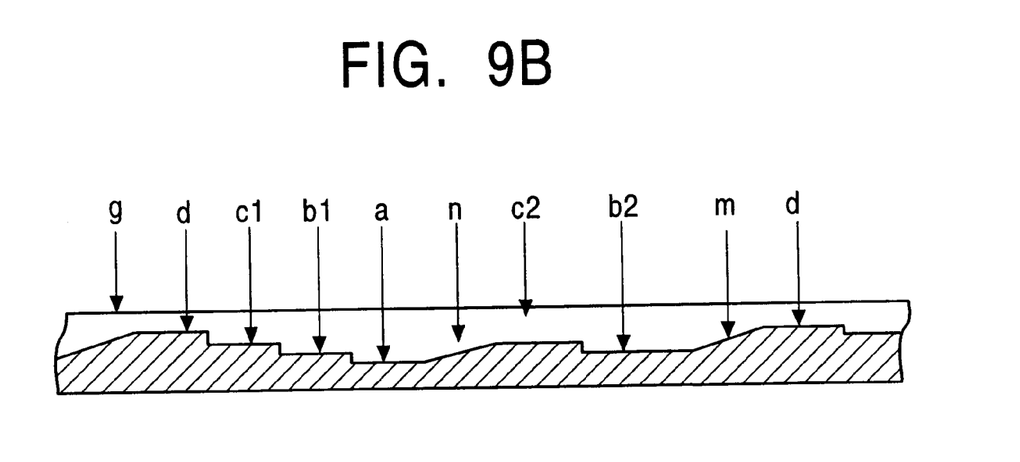

The preferred embodiment of the present invention will be described below with reference to the attached drawings. FIG. 1 is a plan view of an IC card connector device according to an embodiment of the present invention, FIG. 2 is a side view of an ejection mechanism provided in the connector device, FIG. 3 is an exploded plan view of the ejection mechanism, FIG. 4 is a side view of a frame shown in FIG. 3, FIG. 5 is an exploded side view of a pushrod shown in FIG. 3, FIG. 6 is a side view of a drive plate shown in FIG. 3, FIGS. 7A and 7B are side views of first and second presser bar springs shown in FIG. 3, FIGS. 8A, 8B, and 8C are explanatory views showing detailed shapes of a circulation cam groove and a clearance groove shown in FIG. 4 and the heights of cam faces thereof, FIGS. 9A and 9B are explanatory views showing a detailed shape of a heart-shaped cam groove shown in FIG. 5 and the heights of cam faces thereof, FIGS. 10A to 10H are explanatory views showing a normal IC card ejecting operation performed by the ejection mechanism, FIGS. 11A to 11G are explanatory views showing a misoperation canceling operation performed by the ejection mechanism, and FIGS. 12A to 12D are explanatory views showing the relationship between the positions of the pushrod and the cam mechanisms in the ejection mechanism.

Figure 2:
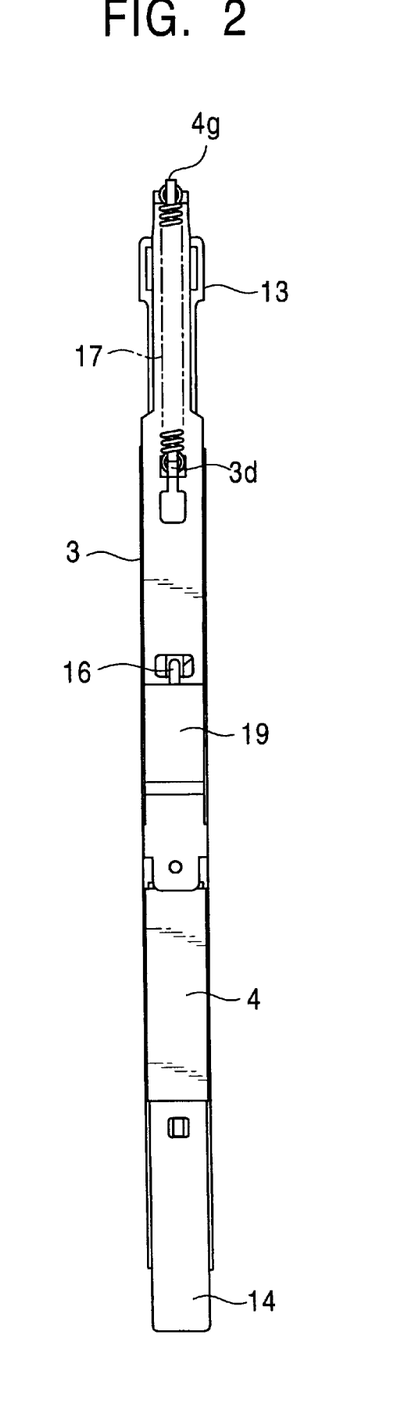
FIG. 2 is a side view of an ejection mechanism provided in the connector device.
Figure 3:
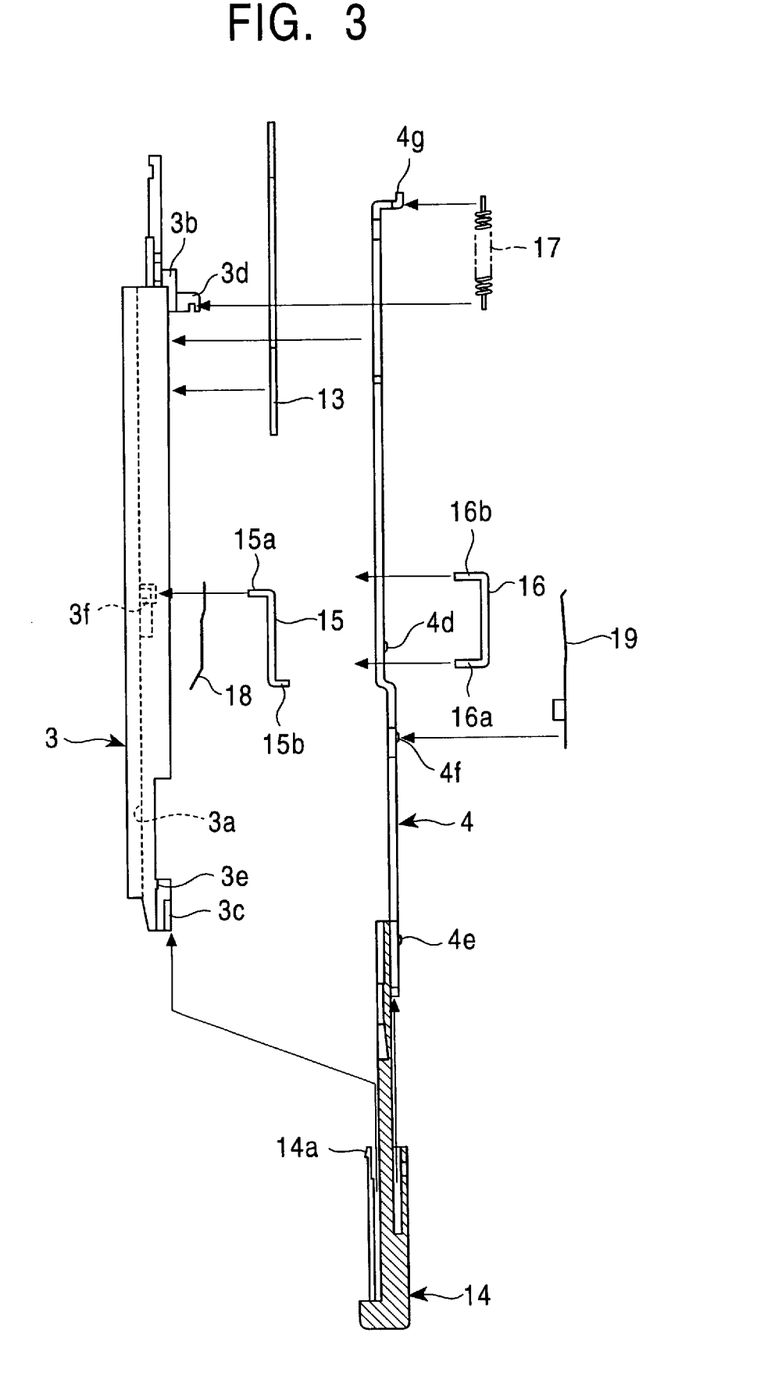
FIG. 3 is an exploded plan view of the ejection mechanism.

Referring to FIGS. 1 to 3, the IC card connector device of this embodiment mainly comprises a pin housing 2 in which a plurality of pin contacts 1 (terminal portions thereof are shown in FIG. 1) are fixedly press-fitted in a predetermined arrangement to be connected to socket contacts in an IC card (not shown), a pair of frames 3 fixed to both sides of the pin housing 2 so as to guide the IC card from both widthwise sides along guide grooves 3a during insertion and extraction of the IC card, a pushrod 4 attached to one of the frames 3, an ejection arm 5 and first and second pivotal arms 6 and 7, respectively, that are pivotally supported on the pin housing 2, and the like. Between the pushrod 4 and the ejection arm 5, an ejection mechanism is interposed, which will be described later.

In the pin housing 2, a first support shaft 8 and a second support shaft 9 are arranged at a predetermined interval, and the first support shaft 8 pivotally supports one end of the ejection arm 5. The ejection arm 5 has a connecting hole 5a, and an engaging portion 5b that projects through the side of one of the frames 3. The first support shaft 8 also pivotally supports the first pivotal arm 6. The first pivotal arm 6 has a protruding piece 6a for pushing out the IC card, and a tongue piece 6b that projects through the connecting hole 5a of the ejection arm 5. In contrast, the second pivotal arm 7 is pivotally supported by the second support shaft 9, and has a protruding piece 7a for pushing out the IC card, and a tongue piece 7b that projects through the connecting hole 5a of the ejection arm 5.

The ejection mechanism will be described in detail. As shown in FIG. 4, the frame 3 has a pair of guide projections 3b and 3c on its outer side face, and a circulation cam groove 11 and a clearance groove 12 are cut therebetween. The circulation cam groove 11 and the clearance groove 12 have a plurality of cam faces of different heights, as shown in FIGS. 8A to 8C. The circulation cam groove 11 forms a groove path that circulates in the order of cam faces D3, C3, B2, . . . , K, E3, and D3, and the clearance groove 12 forms a groove path that leads from a cam face C2 to a cam face A2 via cam faces J and E2. Therefore, the cam groove 11 and the clearance groove 12 share the cam faces A2, L, and D2. A handle 14 that serves as an actuating element is provided at one end of the pushrod 4, and a heart-shaped cam groove 10 is cut on the inner side face thereof, as shown in FIG. 5. The heart-shaped cam groove 10 also has a plurality of cam faces having different heights, and forms a groove path that circulates in the order of cam faces c1, b1, a, . . . , m, d, and c1, as shown in FIGS. 9A and 9B. Since the pushrod 4 is engaged with the guide projections 3b and 3c of the frame 3, it is held by the frame 3 so as to reciprocate in the IC card inserting and extracting direction. That is, as shown in FIGS. 3 and 5, the pushrod 4 is engaged with the frame 3 so that the guide projection 3c is inserted in a space formed on a retaining lug 14a on the inner side of the handle 14, and so that the guide projection 3b is inserted in a guide hole 4a formed at the end opposite from that of the handle 14. The pushrod 4 includes, as shown in FIG. 5, a mounting hole 4b, a clearance hole 4c, a bearing portion 4d for a transmission pin that will be described later, a projection 4e for attaching the handle 14, a projection 4f for a presser bar spring that will be described later, a hook 4g for retaining one end of a coil spring 17, and the like. The pushrod 4 is elastically urged frontward (in the IC card ejecting direction) by the coil spring 17 that is laid between the hook 4g and a hook 3d of the frame 3. Adjacent to the guide projection 3c of the frame 3, an engaging projection 3e is formed to engage and disengage the retaining lug 14a of the pushrod 4.

As shown in FIGS. 2 and 6, a drive plate 13 having a guide hole 13a, in which the guide projection 3b is inserted, is held on the outer side face of the frame 3 so as to reciprocate, and the pushrod 4 is mounted on top of the drive plate 13. The drive plate 13 also has a receiving portion 13b that projects at one end, and an engaging hole 13c at the other end. The receiving portion 13b can move to the position where it overlaps with the cam faces C3 and D3 of the circulation cam groove 11 formed in the frame 3. The engaging hole 13c engages with the engaging portion 5b of the ejection arm 5.

The ejection mechanism further includes, as shown in FIG. 3, a first transmission pin 15 having one end portion 15a inserted in a mounting hole 3f of the frame 3, and an other end portion 15b engaged with the heart-shaped cam groove 10; a first presser bar spring 18 for preventing the end portion 15b of the first transmission pin 15 from falling off the heart-shaped cam groove 10 by elastically urging the end portion 15b toward the heart-shaped cam groove 10; a second transmission pin 16 having one end portion 16a inserted in and pivotally supported by the mounting hole 4b of the pushrod 4, and an other end portion 16b engaged with the circulation cam groove 11 and the clearance groove 12 through the clearance hole 4c; and a second presser bar spring 19 for preventing the end portion 16b of the second transmission pin 16 from falling off the circulation cam groove 11 and the clearance groove 12 by elastically urging the end portion 16b toward the frame 3. That is, with the reciprocating movement of the pushrod 4 relative to the frame 3, the end portion 15b of the first transmission pin 15, which is pivotally supported on the frame 3, moves along the heart-shaped cam groove 10, and the end portion 16b of the second transmission pin 16, which is pivotally supported by the pushrod 4, moves along the circulation cam groove 11 and the clearance groove 12. When the end portion 15b of the first transmission pin 15 is placed on the cam face b1 of the heart-shaped cam groove 10 and actuating force is not applied, the pushrod 4 urged by the coil spring 17 is retained by the first transmission pin 15. When the pushrod 4 is pushed in while the receiving portion 13b of the drive plate 13 and the end portion 16b of the second transmission pin 16 are opposed on the cam face D3 of the circulation cam groove 11, the end portion 16b pushes the drive plate 13. As shown in FIGS. 3 and 7, the first presser bar spring 18 is positioned and mounted to the frame 3 so that the end portion 15a of the first transmission pin 15 is passed through a mounting hole 18a thereof, and the second presser bar spring 19 is positioned and mounted to the pushrod 4 by a pair of protruding pieces 19b so that the projection 4f is passed through a mounting hole 19a thereof. The side of the second transmission pin 16 close to one end portion 16a is laid on the bearing portion 4d of the pushrod 4, while the side close to the other end portion 16b is elastically urged by the second presser bar spring 19. Therefore, the second transmission pin 16 moves along the circulation cam groove 11 and the clearance groove 12 while sliding on the bearing portion 4d that serves as a support.

The above cam mechanism will be described in more detail. In relation to the reciprocating motion of the pushrod 4, the end portion 15b of the first transmission pin 15 traces the cam faces of the heart-shaped cam groove 10 in the direction of the arrows in FIG. 9A. When the end portion 15b is retained on the cam face b1, the pushrod 4 is held in a predetermined retracted position shown in FIG. 12B. When the end portion 15b moves onto the cam face b2 via the cam faces a and n, and the retaining lug 14a of the handle 14 is retained by the engaging projection 3e of the frame 3, the pushrod 4 is held in a first projecting position shown in FIG. 12C. Although the pushrod 4 can be moved to a second projecting position, which is closer to the front side than the first projecting position, against the force of engagement between the retaining lug 14a of the handle 14 and the engaging projection 3e of the frame 3, the pushrod 4 is inhibited from moving frontward from the second projecting position. In contrast, in relation to the reciprocating motion of the pushrod 4, the end portion 16b of the second transmission pin 16 selectively traces the cam faces of the circulation cam groove 11 or the clearance groove 12 in the direction of solid arrows or broken arrows in FIG. 8A. The selection depends on whether the pushrod 4 has moved from the first projecting position to the second projecting position, in other words, whether the end portion 16b of the second transmission pin 16 has been moved from the cam face D3 of the circulation cam groove 11 to the cam face C2 of the clearance groove 12.

Figure 10A:
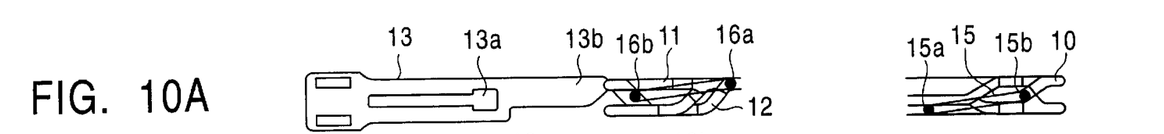
FIGS. 10A to 10H are explanatory views showing a normal IC card ejecting operation performed by the ejection mechanism.

Now, a description will be given of a normal ejection mode for ejecting an IC card after loading in the IC card connector device having the above-described configuration, chiefly with reference to FIGS. 8 to 10, and 12. When an IC card is not loaded, the pushrod 4 is held in the predetermined retracted position shown in FIG. 12B. In this case, since the end portion 15b of the first transmission pin 15 is retained on the cam face b1 of the heart-shaped cam groove 10, as shown in FIG. 10A, the pushrod 4 is stably held in the retracted position by the pulling force of the coil spring 17 and the first transmission pin 15. Furthermore, the end portion 16b of the second transmission pin 16 is positioned on the cam face B2 of the circulation cam groove 11.

Figures 10B, 10C, 10D, 10E:
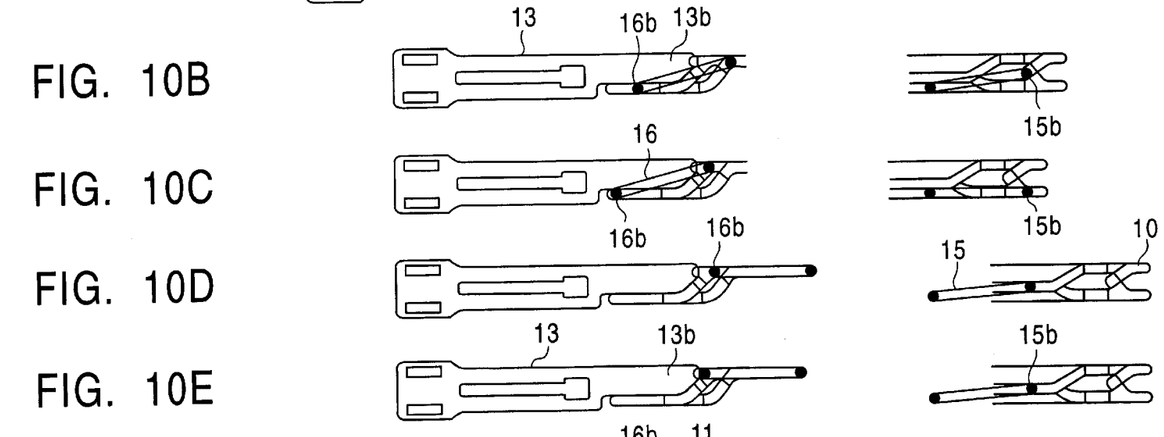

When an IC card is inserted toward the pin housing 2 along the guide groove 3a of the frame 3, it press-fits the pin contacts 1 of the pin housing 2 into socket contacts thereof while pushing the protruding pieces 6a and 7a of the first and second pivotal arms 6 and 7, respectively. Therefore, the IC card can be reliably connected to the pin contacts 1 by being inserted into the connector device by a predetermined distance, and the loading operation is completed, as shown in FIG. 10B. In this case, the first pivotal arm 6 and the second pivotal arm 7 pivot on the first support shaft 8 and the second support shaft 9, respectively, in opposite directions. Since the pivotal movements of the pivotal arms 6 and 7 are transmitted to the ejection arm 5 via the tongue pieces 6b and 7b, the ejection arm 5 pivots on the first support shaft 8, and the drive plate 13 is thereby moved frontward along the frame 3. This moves the receiving portion 13b of the drive plate 13 on the cam face D3 of the circulation cam groove 11, so that an inclined face of the receiving portion 13b moves the end portion 16b of the second transmission pin 16 from the cam face B2 to the cam face A2 of the circulation cam groove 11. Since the end portion 15b of the first transmission pin 15 remains retained on the cam face b1 of the heart-shaped cam groove 10, however, the pushrod 4 remains held in the retracted position while the IC card is connected.

Figure 12A:
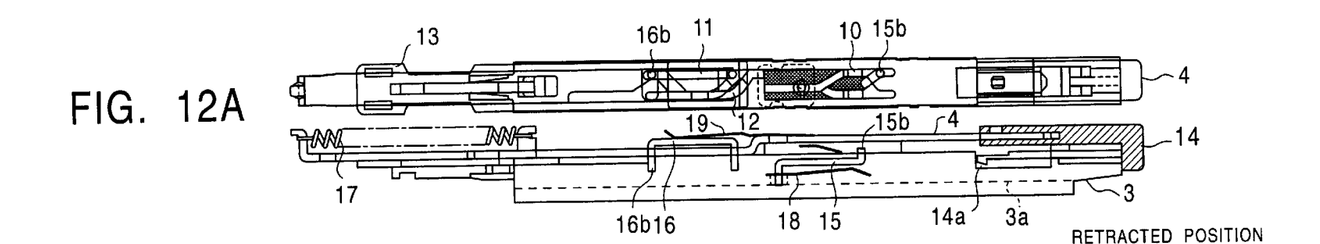
FIGS. 12A to 12D are explanatory views showing the relationship between the positions of the pushrod and the cam mechanisms in the ejection mechanism.
Figure 12B:
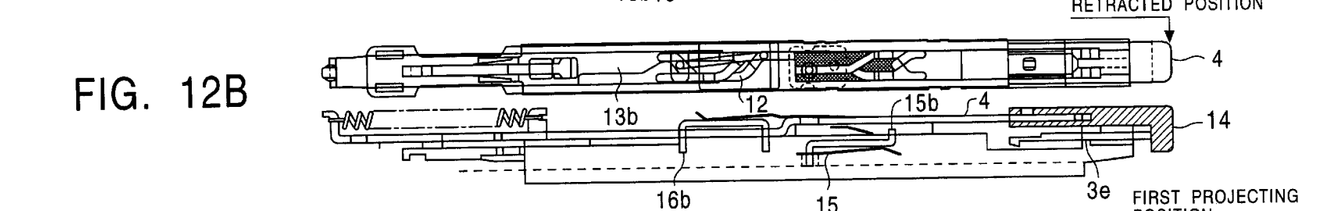
Figure 12C:
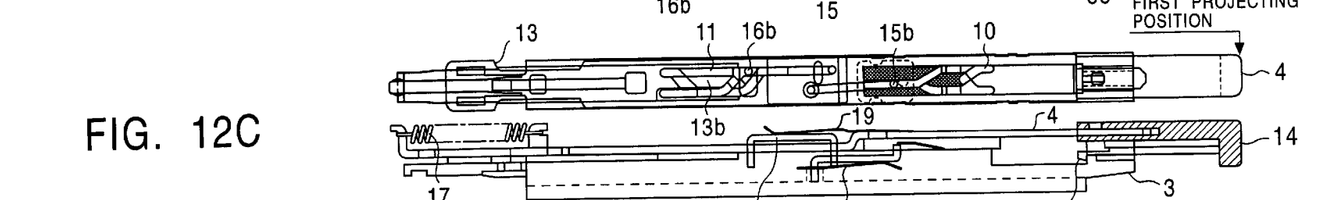

In order to eject the IC card in this state, first, the pushrod 4 held in the retracted position is further pushed in the retracting direction (the IC card inserting direction) so as to shift the end portion 15b of the first transmission pin 15 from the cam face b1 to the cam face a of the heart-shaped cam groove 10, as shown in FIG. 10C, and the pushing force is then removed. The released pushrod 4 is moved frontward (in the IC card ejecting direction) by a predetermined distance by the pulling force of the coil spring 17. With this movement of the pushrod 4, the end portion 15b of the first transmission pin 15 shifts to the cam face b2 via the cam faces n and c2 of the heart-shaped cam groove 10, as shown in FIG. 10D. Since the frontward movement of the pushrod 4 is inhibited when the retaining lug 14a is retained by the engaging projection 3e of the frame 3, as shown in FIG. 12C, the pushrod 4 is stopped at the first projecting position. While the pushrod 4 is thus moving toward the first projecting position, the end portion 16b of the second transmission pin 16 shifts from the cam face A2 to the cam face D3 via the cam faces L, D2, K, and E3 of the circulation cam groove 11. Consequently, the end portion 16b of the second transmission pin 16 and the E3 receiving portion 13b of the drive plate 13 face each other in the cam face D3, as shown in FIG. 10D.

Figures 10F, 10G, 10H:
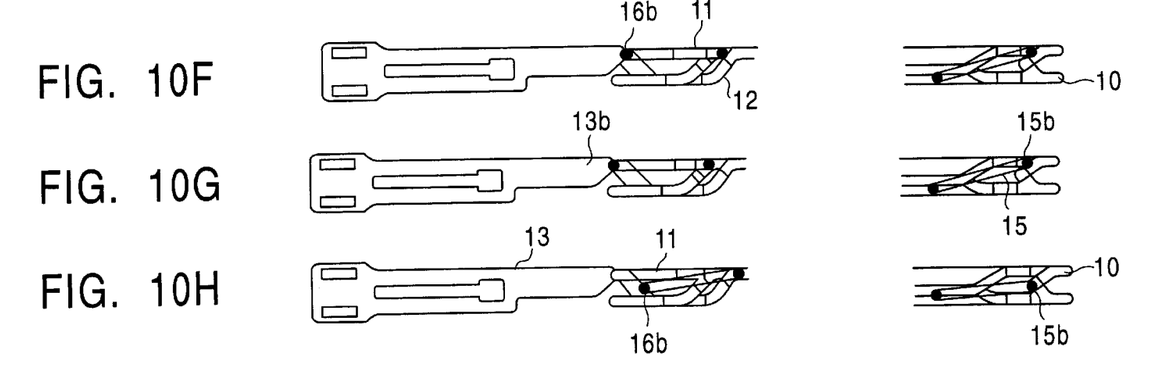

When the handle 14 is pushed in the retracting direction after the pushrod 4 is thus projected to the first projecting position, the end portion 15b of the first transmission pin 15 shifts from the cam face b2 to the cam face c1 via the cam faces m and d of the heart-shaped cam groove 10, as shown in FIGS. 10E to 10G. By removing the pushing force in the full-stroke state shown in FIG. 12A, the end portion 15b of the first transmission pin 15 is retained on the cam face b1 of the heart-shaped cam groove 10, as shown in FIGS. 10H and 12B, and the pushrod 4 is held again in the retracted position. In this case, while the end portion 16b of the second transmission pin 16 shifts from the cam face D3 to the cam face B2 via the cam face C3 of the circulation cam groove 11, since it pushes the receiving portion 13b of the drive plate 13, the ejection arm 5 engaged with the drive plate 13 is pivoted. With this pivotal motion of the ejection arm 5, the protruding pieces 6a and 7a of the first and second pivotal arms 6 and 7 push both front ends of the IC card nearly straight in the ejecting direction. As a result, the IC card is slightly pushed out in the ejecting direction, and the press-fitting of the pin contacts 1 in the socket contacts is released. By pulling the front side of the IC card with the fingers in this state, the IC card can be easily ejected from the connector device.

Figures 11A, 11B, 11C:
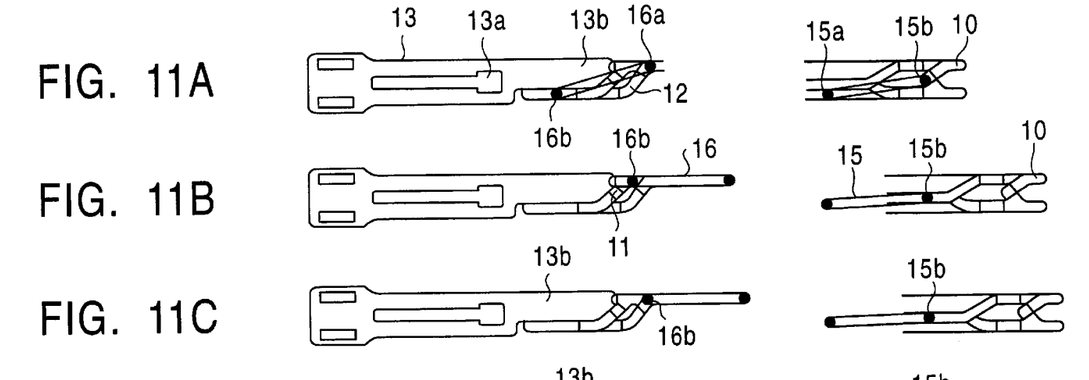
FIGS. 11A to 11G are explanatory views showing a misoperation canceling operation performed by the ejection mechanism.
Figure 11D:
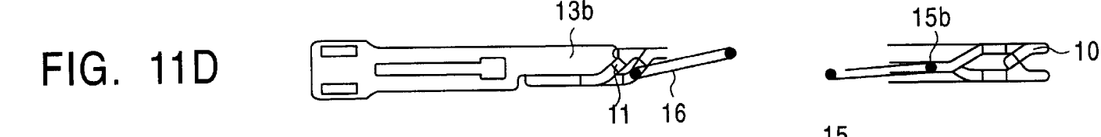
Figures 11E, 11F:
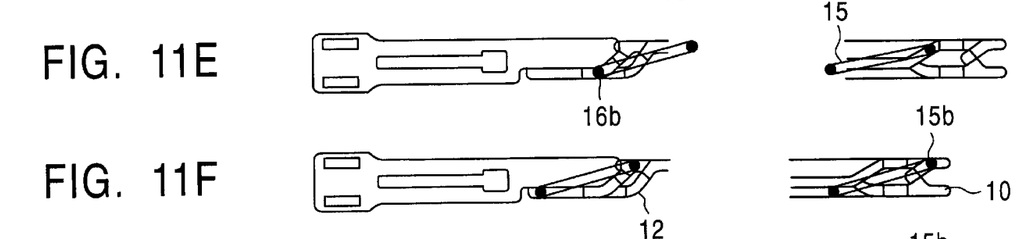
Figure 11G:
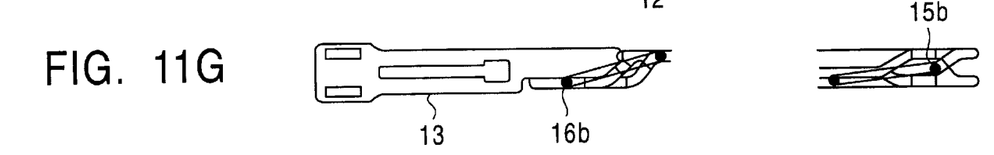

Next, a description will be given of a misoperation canceling mode needed when the pushrod 4 is inadvertently projected after an IC card is loaded, chiefly with reference to FIGS. 8, 9, 11, and 12. FIG. 11A shows a state in which an IC card is loaded and the pushrod 4 is held in the predetermined retracted position, similarly to FIG. 10B. If the pushrod 4 is inadvertently pushed in this state although there is no need to eject the IC card, it projects to the first projecting position, as described above, and the end portion 16a of the second transmission pin 16 and the receiving portion 13b of the drive plate 13 face each other in the cam face D3 of the circulation cam groove 11, as shown in FIGS. 11B and 12C. The end portion 15b of the first transmission pin 15 shifts to the cam face b2 of the heart-shaped cam groove 10.

Figure 12D:
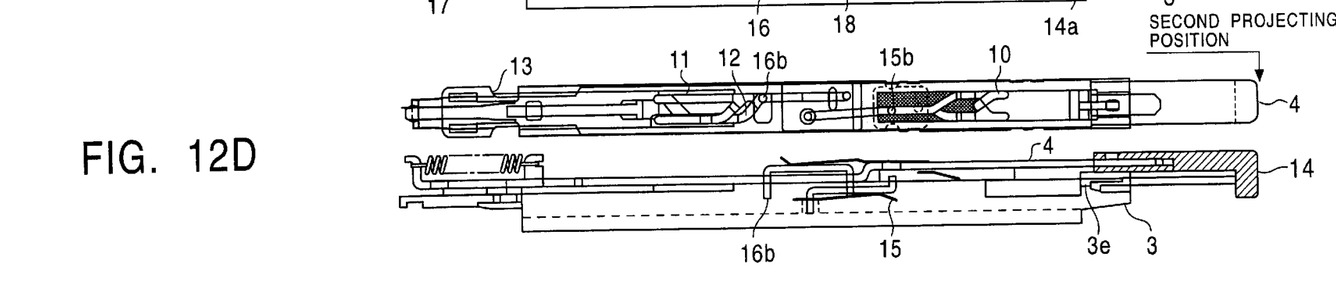

By further pulling the pushrod 4 in the first projecting position frontward to the second projecting position shown in FIG. 12D, the end portion 15b of the first transmission pin 15 remains in the cam face b2 of the heart-shaped cam groove 10, as shown in FIG. 11C, whereas the end portion 16b of the second transmission pin 16 shifts from the cam face D3 of the circulation cam groove 11 to the cam face C2 of the clearance groove 12. When the handle 14 of the pushrod 4 is pushed from this second projecting position in the retracting direction, the end portion 15b of the first transmission pin 15 shifts from the cam face b2 of the heart-shaped cam groove 10 to the cam face b1 via the cam faces m, d, and c1, as shown in FIGS. 11D to 11G, and is retained thereon. Therefore, the pushrod 4 is held again in the retracted position. Since the end portion 16b of the second transmission pin 16 moves from the cam face C2 of the clearance groove 12 to the cam face A2 via the cam faces J, E2, D2, and L, however, it does not push the receiving portion 13b of the drive plate 13 during this movement. For this reason, the ejection arm 5 is not pivoted, and the IC card remains in the loaded state. That is, when the pushrod 4 is inadvertently projected to the first projecting position, it is pulled out to the second projecting position, and is then pushed into the state shown in FIG. 11G. This state is just the same as the states shown in FIGS. 10B and 11A, and the pushrod 4 is returned to the state before the misoperation is performed, without disconnecting the IC card. Accordingly, it is possible to perform operations similar to those shown in FIGS. 10C to 10H in the normal ejection mode, without any trouble.

As described above, in this embodiment, the pushrod 4 is projected to the first projecting position in the first pushing operation, and is then pushed in the retracting direction in the second direction. The pushing force is transmitted to the drive plate 13 via the second transmission pin 16 that traces the circulation cam groove 11, and the loaded IC card is ejected. Therefore, even when the pushrod 4 is inadvertently pushed or subjected to impact, the IC card is unlikely to be disconnected. In the case in which the pushrod 4 is projected to the first projecting position although there is no need to eject the IC card, for example, in a case in which one of the pushrods of two upper and lower ejection mechanisms arranged vertically is operated by mistake instead of the desired pushrod, the pushrod 4 is pulled from the first projecting position to the second projecting position, and is then pushed in the retracting direction. By doing this, the second transmission pin 16 departs from the normal path in the circulation cam groove 11, and traces a path in the clearance groove 12, whereby the state before the misoperation can be recovered without pushing the drive plate 13 by the second transmission pin 16. Therefore, it is possible to cancel the ejection of the IC card, and to maintain the IC card in the loaded state.

While a single IC card can be loaded in the connector device of the above embodiment, the present invention is also applicable to a connector device in which two or more IC cards can be loaded.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An IC card connector device having a frame for supporting an IC card so that the IC card can be inserted and extracted, a pushrod held to reciprocate along said frame and elastically urged in an IC card ejecting direction, and a plurality of pin contacts to be connected to socket contacts in the loaded IC card, wherein said pushrod held in a predetermined retracted position is moved frontward by a first pushing operation while the IC card is loaded, and said pushrod held in a predetermined projecting position is pushed by a second pushing operation to eject the IC card, said IC card connector device comprising:

a heart-shaped cam groove cut in an actuating element of said pushrod;

a first transmission pin directly or indirectly attached to said frame to move along said heart-shaped cam groove, and retained at a predetermined position of said heart-shaped cam groove to hold said pushrod in the retracted position;

a circulation cam groove and a clearance groove cut in said frame; and a second transmission pin attached to said pushrod to move along said circulation cam groove during said first and second pushing operations, and to push an IC card ejecting member while moving in a predetermined region of said circulation cam groove, wherein said pushrod is moved from the retracted position to the first projecting position and is held thereat by said first pushing operation, and the IC card is ejected via said second transmission pin by said second pushing operation when said pushrod is in said first projecting position, and wherein said pushrod in said first projecting position is moved by a pulling operation to a second projecting position that is closer to the front side than said first projecting position, said second transmission pin moves from said circulation cam groove to said clearance groove in relation to the pulling operation, and said second transmission pin is moved to said circulation cam groove along said clearance groove by a pushing operation for said pushrod in said second projecting position.

2. An IC card connector device according to claim 1, wherein said IC card ejecting member is a drive plate that is held to reciprocate along said frame and that enters said circulation cam groove when the IC card is loaded, and the IC card is ejected by pushing said drive plate by said second transmission pin.

3. An IC card connector device according to claim 2, wherein said second transmission pin returns to said circulation cam groove through a path in which it is not in contact with said drive plate, by being moved along said clearance groove during the pushing operation for said pushrod in said second projecting position.

* * * * *